(12) United States Patent
Park et al.

(10) Patent No.: US 8,300,540 B2
(45) Date of Patent: Oct. 30, 2012

(54) SYSTEMS AND METHODS FOR DYNAMIC NETWORK CHANNEL MODIFICATION

(75) Inventors: Daniel J. Park, Beaverton, OR (US); Deepak Ayyagari, Vancouver, WA (US); George M. Peponides, Encinitas, CA (US); James E. Petranovich, San Diego, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 740 days.

(21) Appl. No.: 11/089,629

(22) Filed: Mar. 23, 2005

(65) Prior Publication Data

US 2005/0169177 A1 Aug. 4, 2005

Related U.S. Application Data

(63) Continuation of application No. PCT/US2004/036785, filed on Nov. 5, 2004.

(60) Provisional application No. 60/518,036, filed on Nov. 7, 2003, provisional application No. 60/518,224, filed on Nov. 7, 2003, provisional application No. 60/518,237, filed on Nov. 7, 2003, provisional application No. 60/518,574, filed on Nov. 7, 2003, provisional application No. 60/537,492, filed on Jan. 19, 2004, provisional application No. 60/573,353, filed on May 21, 2004.

(51) Int. Cl.
*G01R 31/08* (2006.01)
(52) U.S. Cl. .................... 370/252; 370/395.21
(58) Field of Classification Search .................. 370/230, 370/252, 395.21
See application file for complete search history.

(56) References Cited

U.S. PATENT DOCUMENTS

| | | | |
|---|---|---|---|
| 4,313,212 A | 1/1982 | Whitlock | |
| 5,402,413 A | 3/1995 | Dixon | |
| 5,495,483 A | 2/1996 | Grube et al. | |
| 5,541,955 A | 7/1996 | Jacobsmeyer | |
| 5,596,439 A | 1/1997 | Dankberg et al. | |
| 5,644,573 A | 7/1997 | Bingham et al. | |
| 5,828,963 A | 10/1998 | Grandhi et al. | |
| 5,949,769 A | 9/1999 | Davidson et al. | |
| 6,006,271 A | 12/1999 | Grabiec et al. | |
| 6,038,455 A | 3/2000 | Gardner et al. | |
| 6,084,886 A | 7/2000 | Dehner et al. | |
| 6,097,700 A | 8/2000 | Thornberg et al. | |
| 6,167,095 A | 12/2000 | Furukawa et al. | |
| 6,233,240 B1 | 5/2001 | Barbas et al. | |
| 6,278,723 B1 | 8/2001 | Meihofer et al. | |
| 6,278,883 B1 | 8/2001 | Choi | |
| 6,400,819 B1 | 6/2002 | Nakano et al. | |
| 6,408,033 B1 | 6/2002 | Chow et al. | |

(Continued)

FOREIGN PATENT DOCUMENTS

JP 05-304530 11/1993

(Continued)

OTHER PUBLICATIONS

International Application No. PCT/US04/036797 International Search Report.

(Continued)

*Primary Examiner* — Sai-Ming Chan
(74) *Attorney, Agent, or Firm* — Krieger Intellectual Property, Inc.; Scott C. Krieger (57) ABSTRACT

Embodiments of the present invention comprise methods and systems for establishment and modification of network allocation parameters.

22 Claims, 7 Drawing Sheets

U.S. PATENT DOCUMENTS

| | | |
|---|---|---|
| 6,480,506 B1 | 11/2002 | Gubbi |
| 6,618,366 B1 | 9/2003 | Furukawa et al. |
| 6,668,175 B1 | 12/2003 | Almgren et al. |
| 6,674,750 B1 | 1/2004 | Castellano |
| 6,700,875 B1 | 3/2004 | Schroeder et al. |
| 6,718,393 B1 | 4/2004 | Aditya |
| 6,741,554 B2 | 5/2004 | D'Amico et al. |
| 6,754,176 B1 | 6/2004 | Gubbi et al. |
| 6,763,384 B1 | 7/2004 | Gupta |
| 6,795,418 B2 | 9/2004 | Choi |
| 6,826,186 B1 | 11/2004 | Ditta et al. |
| 6,850,981 B1 | 2/2005 | Ho et al. |
| 6,865,609 B1 | 3/2005 | Gubbi et al. |
| 6,877,043 B2 | 4/2005 | Mallory et al. |
| 6,891,841 B2 | 5/2005 | Leatherbury et al. |
| 6,934,554 B2 | 8/2005 | Mizuno et al. |
| 6,934,752 B1 | 8/2005 | Gubbi |
| 6,947,748 B2 | 9/2005 | Li et al. |
| 7,043,244 B1 * | 5/2006 | Fauconnier ............ 455/442 |
| 7,050,452 B2 | 5/2006 | Sugar et al. |
| 7,072,315 B1 | 7/2006 | Liu et al. |
| 7,076,220 B2 | 7/2006 | Backes et al. |
| 7,110,366 B2 | 9/2006 | Hulyalkar et al. |
| 7,110,380 B2 | 9/2006 | Shvodian |
| 7,151,558 B1 | 12/2006 | Kogane |
| 7,180,884 B2 | 2/2007 | Elliott |
| 7,233,991 B2 | 6/2007 | Adhikari |
| 7,269,185 B2 | 9/2007 | Kirby et al. |
| 7,295,518 B1 | 11/2007 | Monk et al. |
| 7,298,289 B1 | 11/2007 | Hoffberg |
| 7,315,573 B2 * | 1/2008 | Lusky et al. ............ 375/224 |
| 7,561,539 B2 | 7/2009 | Sugaya |
| 2001/0037412 A1 | 11/2001 | Miloushev et al. |
| 2002/0022483 A1 | 2/2002 | Thompson et al. |
| 2002/0062472 A1 * | 5/2002 | Medlock et al. ............ 716/1 |
| 2002/0094011 A1 | 7/2002 | Okumura et al. |
| 2002/0133589 A1 | 9/2002 | Gubbi et al. |
| 2002/0137467 A1 * | 9/2002 | Tzannes ............ 455/69 |
| 2002/0159418 A1 | 10/2002 | Rudnick et al. |
| 2002/0163928 A1 | 11/2002 | Rudnick et al. |
| 2003/0002529 A1 | 1/2003 | Kurdzinski et al. |
| 2003/0012166 A1 | 1/2003 | Benveniste |
| 2003/0012167 A1 | 1/2003 | Benveniste |
| 2003/0012176 A1 | 1/2003 | Kondylis et al. |
| 2003/0016732 A1 | 1/2003 | Miklos et al. |
| 2003/0040319 A1 | 2/2003 | Hansen et al. |
| 2003/0067892 A1 | 4/2003 | Beyer et al. |
| 2003/0081603 A1 | 5/2003 | Rune |
| 2003/0084283 A1 * | 5/2003 | Pixton ............ 713/163 |
| 2003/0126536 A1 | 7/2003 | Gollamudi et al. |
| 2003/0147368 A1 | 8/2003 | Eitan et al. |
| 2003/0161268 A1 * | 8/2003 | Larsson et al. ............ 370/229 |
| 2003/0161340 A1 | 8/2003 | Sherman |
| 2003/0169697 A1 | 9/2003 | Suzuki |
| 2003/0174665 A1 | 9/2003 | Benveniste |
| 2003/0181165 A1 | 9/2003 | Sugar et al. |
| 2003/0199279 A1 | 10/2003 | Roberts |
| 2003/0224787 A1 | 12/2003 | Gandolfo |
| 2003/0231621 A1 | 12/2003 | Gubbi et al. |
| 2003/0231715 A1 | 12/2003 | Shoemake et al. |
| 2004/0001429 A1 | 1/2004 | Ma et al. |
| 2004/0013102 A1 | 1/2004 | Fong et al. |
| 2004/0013135 A1 | 1/2004 | Haddad |
| 2004/0022181 A1 | 2/2004 | Coffey |
| 2004/0053621 A1 | 3/2004 | Sugaya |
| 2004/0058686 A1 | 3/2004 | Odman |
| 2004/0062229 A1 | 4/2004 | Ayyagari et al. |
| 2004/0066738 A1 | 4/2004 | Stopler |
| 2004/0082337 A1 * | 4/2004 | Lacroix et al. ............ 455/450 |
| 2004/0100897 A1 | 5/2004 | Shattil |
| 2004/0125786 A1 | 7/2004 | Fuchs |
| 2004/0136393 A1 | 7/2004 | Insua et al. |
| 2004/0166869 A1 | 8/2004 | Laroia et al. |
| 2004/0184398 A1 | 9/2004 | Walton et al. |
| 2004/0224634 A1 | 11/2004 | Kim |
| 2004/0224676 A1 | 11/2004 | Iseki |
| 2005/0030890 A1 | 2/2005 | Benco et al. |
| 2005/0030967 A1 | 2/2005 | Ohmi |
| 2005/0192037 A1 | 9/2005 | Nanda et al. |
| 2006/0039275 A1 | 2/2006 | Walton et al. |
| 2006/0114826 A1 | 6/2006 | Brommer |
| 2006/0227706 A1 | 10/2006 | Burst |
| 2006/0250973 A1 | 11/2006 | Trott |
| 2006/0251098 A1 | 11/2006 | Morioka |
| 2007/0211786 A1 | 9/2007 | Shattil |
| 2008/0039148 A1 | 2/2008 | Rudolf |

FOREIGN PATENT DOCUMENTS

| | | |
|---|---|---|
| JP | 11-205352 | 7/1999 |
| JP | 2000-165930 | 6/2000 |
| JP | 2004-503181 | 1/2002 |
| JP | 2004-537875 | 6/2002 |
| JP | 2003-110571 | 4/2003 |
| JP | 2003-249936 | 9/2003 |
| WO | WO00/74322 | 7/2000 |
| WO | WO02/41586 | 5/2002 |

OTHER PUBLICATIONS

International Application No. PCT/US04/036797 International Preliminary Examination Report.
International Application No. PCT/US04/036798 International Search Report.
International Application No. PCT/US04/036799 International Preliminary Examination Report.
International Application No. PCT/US04/036799 International Search Report.
International Application No. PCT/US04/036786 International Preliminary Examination Report.
International Application No. PCT/US04/036786 International Search Report.
International Application No. PCT/US04/036796 International Preliminary Examination Report.
International Application No. PCT/US04/036796 International Search Report.
International Application No. PCT/US04/036969 International Preliminary Examination Report.
International Application No. PCT/US04/036969 International Search Report.
International Application No. PCT/US04/036785 International Preliminary Examination Report.
International Application No. PCT/US04/036785 International Search Report A.
International Application No. PCT/US04/036785 International Search Report B.
U.S. Appl. No. 11/089,882—Office Action dated May 21, 2008.
U.S. Appl. No. 11/089,792—Office Action dated Feb. 21, 2006.
U.S. Appl. No. 11/089,792—Office Action dated Mar. 28, 2006.
U.S. Appl. No. 11/089,792—Office Action dated Nov. 6, 2006.
U.S. Appl. No. 11/089,792—Office Action dated Apr. 25, 2007.
U.S. Appl. No. 11/089,792—Office Action dated Aug. 8, 2007.
U.S. Appl. No. 11/090,549—Office Action dated Dec. 12, 2007.
U.S. Appl. No. 11/098,623 Office Action dated Aug. 15, 2008.
U.S. Appl. No. 11/89,626 Office Action dated Feb. 2, 2009.
U.S. Appl. No. 11/089,759 Office Action dated Aug. 4, 2008.
U.S. Appl. No. 11/089,759 Office Action dated Jan. 26, 2009.
U.S. Appl. No. 11/089,882 Office Action dated Feb. 24, 2009.
U.S. Appl. No. 11/089,756 Office Action dated Jul. 21, 2008.
U.S. Appl. No. 11/089,756 Office Action dated Dec. 24, 2008.
U.S. Appl. No. 11/090,549 Office Action dated Jul. 10, 2008.
U.S. Appl. No. 11/90,549 Office Action dated Jan. 5, 2009.
U.S. Appl. No. 11/089,756—Office Action dated—Sep. 10, 2009.
U.S. Appl. No. 11/089,759—Notice of Allowance dated Oct. 8, 2009.
U.S. Appl. No. 11/089,792—Notice of Allowance dated Jan. 28, 2008.
U.S. Appl. No. 11/090,549—Office Action dated Dec. 30, 2009.
U.S. Appl. No. 11/089,623—Office Action dated Sep. 17, 2009.
U.S. Appl. No. 11/090,549—Office Action dated Jul. 7, 2009.
U.S. Appl. No. 11/089,882—Office Action dated Oct. 8, 2009.
Japanese Office Action JP2006-538485 corresponding to U.S. Appl. No. 11/090,549 which has technical similarities to the present application.

European Search Report for PCT/US 2004036785 corresponding to U.S. Appl. No. 11/089,629 which has technical similarities to the present application.

International Application No. PCT/US04/036798 International Preliminary Examination Report (Previously cited incorrected in the Information Disclosure Statement dated Jun. 2, 2008.).

European Search Report for PCT/US 2004036797 corresponding to U.S. Appl. No. 11/089,882 which has technical similarities to the present application.

Japanese Office Action JP2007-503890 corresponding to U.S. Appl. No. 11/089,759 which has technical similarities to the present application.

Japanese Office Action JP2007-527184 corresponding to U.S. Appl. No. 11/089,756 which has technical similarities to the present application.

Japanese Office Action JP2006-538487 corresponding to U.S. Appl. No. 11/089,792 which has technical similarities to the present application.

Decision of Rejection for JP2006-538487 corresponding to U.S. Appl. No. 11/089,792 which has technical similarities to the present application.

U.S. Appl. No. 11/089,623—Non-Final Office Action dated Feb. 2, 2009 (Previously cited incorrectly in the information Disclosure Statement dated Jun. 2, 2009.).

U.S. Appl. No. 11/089,623—Non-Final Office Action dated Mar. 16, 2010.

U.S. Appl. No. 11/089,756—Notice of Allowance dated May 27, 2010.

* cited by examiner

SYSTEMS AND METHODS FOR DYNAMIC NETWORK CHANNEL MODIFICATION

CROSS-REFERENCE TO RELATED APPLICATIONS

This application is a continuation of International Patent Application No. PCT/US2004/36785 filed Nov. 5, 2004 which claims the benefit of U.S. Provisional Patent Applications: No. 60/518,036 filed Nov. 7, 2003 entitled "OFDMA (FDM+TDM) Schedulers for OFDM PHY's"; No. 60/518,036 60/518,224 filed Nov. 7, 2003 entitled "Reconfiguration of Sub-Channels in an OFDM System"; No. 60/518,237 filed Nov. 7, 2003 entitled "Network Bandwidth Optimization For Channel Estimation Measurements"; No. 60/518,574 filed Nov. 7, 2003 entitled "Selection Of Fixed Versus Dynamic Modulation Settings In An OFDM System"; No. 60/537,492 filed Jan. 19, 2004 entitled "Resource Coordination Architecture For Neighboring Networks"; and No. 60/573,353 filed May 21, 2004 entitled "System Design Document For Neighbor Network Operations."

BACKGROUND OF THE INVENTION

In a communications system, such as a wireless, wired or powerline networking system, which uses multiple sub-channels to transmit data from one device to another device, the selection of sub-channels on which to transmit and the modulation on each sub-channel may be adjusted to achieve various goals. An Orthogonal Frequency Division Multiplexing (OFDM) system is one example of a system with multiple channels and modulation settings.

BRIEF SUMMARY OF THE INVENTION

In a communications system, such as a wireless, wired or powerline networking system, which uses multiple sub-channels to transmit data from one device to another device, the selection of sub-channels on which to transmit and the modulation on each sub-channel may be set to maximize the efficiency of the network. After the initial allocation and configuration of sub-channels for a connection, the system may continue to monitor the performance of the network and may make adjustments to the sub-channel allocation or modulation on each sub-channel. In some embodiments, the communication system may endeavor to maximize the network utilization while satisfying the QoS requirements of the various connections within the network.

In networking system embodiments with multiple sub-channels, the performance of the channels between any two communicating devices may be monitored. The selected sub-channels on which to communicate and the modulation used on these sub-channels may be configured based on the network performance experienced by the two devices.

The foregoing and other objectives, features, and advantages of the invention will be more readily understood upon consideration of the following detailed description of the invention taken in conjunction with the accompanying drawings.

DETAILED DESCRIPTION OF PREFERRED EMBODIMENTS

In embodiments of the present invention, the decisions for sub-channel re-configuration may be centralized in the network at a device called a central coordinator (CCo). The CCo may have a global view of network performance including, but not limited to, the demands on the network from all communication devices. In some embodiments, the CCo is able to use this global view of the network state to balance the competing needs of the various active connections. In these embodiments, the CCo may re-configure the sub-channels for a connection between two or more devices. This reconfiguration may appear to be much less than optimal from the point of view of the devices, however, the overall system performance may be improved.

For example, a connection may be allocated a high number of sub-channels each of which provide poor bandwidth, but the aggregate meets the connection's QoS needs. Alternatively, the connection may be allocated a lower number of high performance sub-channels that meet the same QoS needs. The CCo may make these allocations because the high performance sub-channels are the only sub-channels that will service a second connection even if the second connection has a lower priority than the first connection. The devices of the first connection view the allocation as sub-optimal while from a system perspective, the allocation is optimal because the QoS requirements of two connections are satisfied.

In a networking system with multiple sub-channels and in which the performance of the channels varies with time, the system may modify the set of sub-channels allocated to a connection by adding or removing sub-channels from the set or by changing the modulation type or modulation density of the sub-channels. Because multiple connections on the network compete for access to sub-channels, the CCo may consider multiple system parameters when making changes to the sets of sub-channels allocated to connections.

The list of parameters considered by the CCo comprises, but is not limited to:
- The performance (bandwidth and error rate) of each sub-channel between each pair of devices
- The sub-channel's current allocations and if theses allocations are to connections with high or lower priority than the connection being considered.

The additional network efficiency cost of sub-channels that must be assigned as guard bands based on the modulation of the sub-channel being considered The additional network efficiency cost of sub-channels that must be assigned as pilot signal based on the modulation of the sub-channel being considered.

The CCo may consider the demands on network resources from all connections and processes when deciding how to best re-allocate resources to active connections so that the overall network utilization is maximized.

Embodiments of the present invention may be implemented in a variety of network systems, including, but not limited to, powerline networks, wireless networks, wired networks and others. Specific embodiments may be implemented in the Avalanche network protocol described in the Avalanche specification: *Power Line Communications (PLC) AV, Avalanche Protocol Specification; Version* 0.4.1, Oct. 8, 2003, which is hereby incorporated herein by reference.

Figure 1:
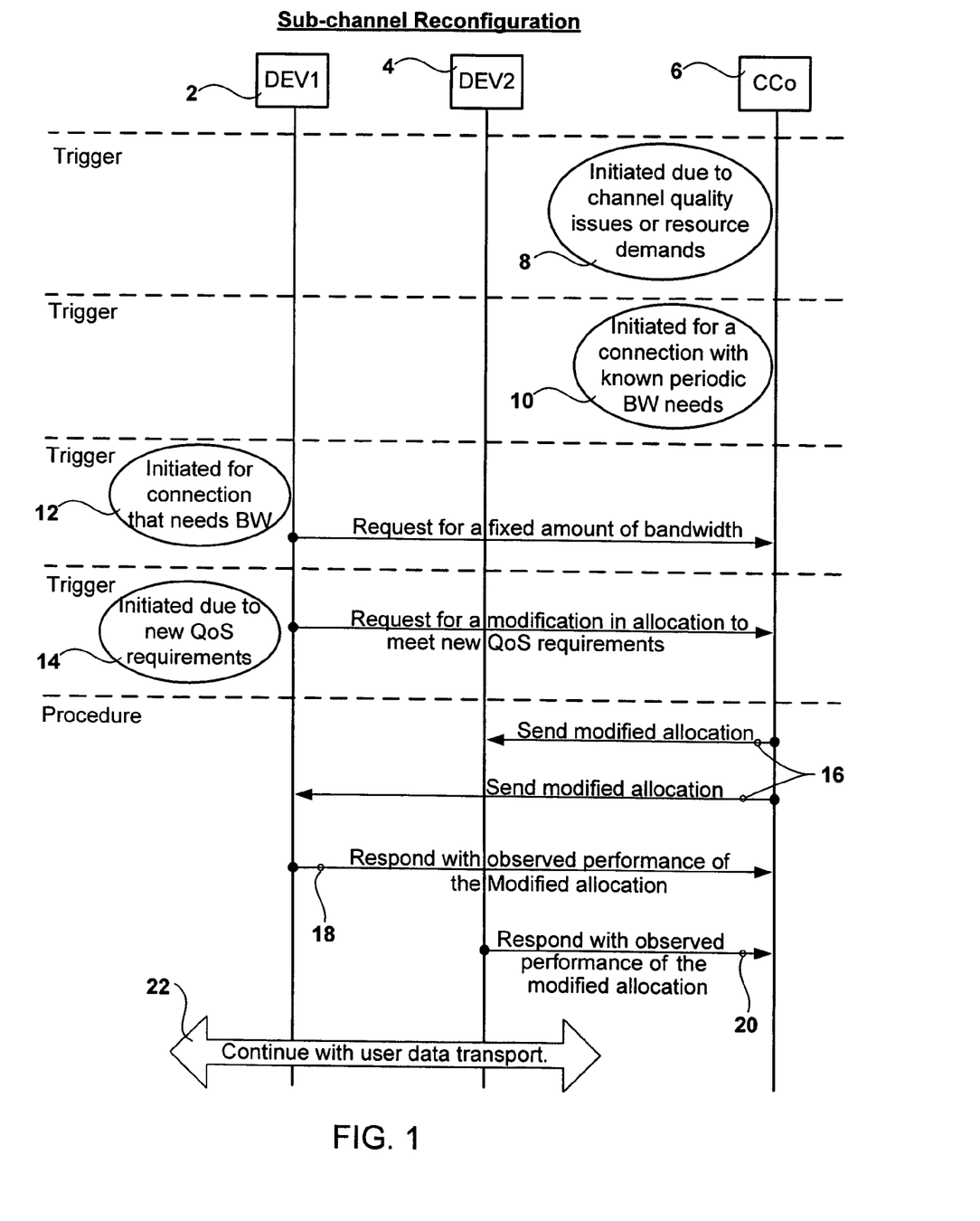
FIG. 1 is a diagram showing an overview of several connection modification embodiments of the present invention.

Some embodiments of the present invention may be described with reference to FIG. 1. In these embodiments, a connection modification or reconfiguration process may be triggered by the CCo 6 to manage the allocation of network resources. For example, the CCo 6 may change or move the allocations to a connection to resolve problems caused by channel quality issues or resource demands 8. A CCo 6 may also periodically allocate bandwidth to a connection 10. When a periodic allocation is assigned, it may have no conflicting allocations, however, later, higher-priority allocations may cause conflicts. In this case, the periodic allocation may be modified or reconfigured to avoid those conflicts.

The reconfiguration process may also be triggered by a device 2 & 4, which requests bandwidth for a connection that does not have a permanent allocation 12. In this case, a connection may be modified to increase or decrease the bandwidth allocated to the connection. The reconfiguration process may also be triggered by a device 2 & 4 in response to new QoS needs 14 for a connection as requested by an application on the device 2 & 4. For example, an existing connection may initiate streaming of multimedia content, which will require a higher QoS priority than static content.

In some embodiments, the CCo 6 may send a reconfiguration message 16 to the two devices 2 & 4 involved with the connection. The message may specify an allocation for the reconfigured physical channel. The two devices 2 & 4 may then send a response message to the CCo to report the performance observed on the re-configured connection 18 & 20. The connection may continue 22 to carry user traffic with the new configuration of the sub-channels.

Figure 2:
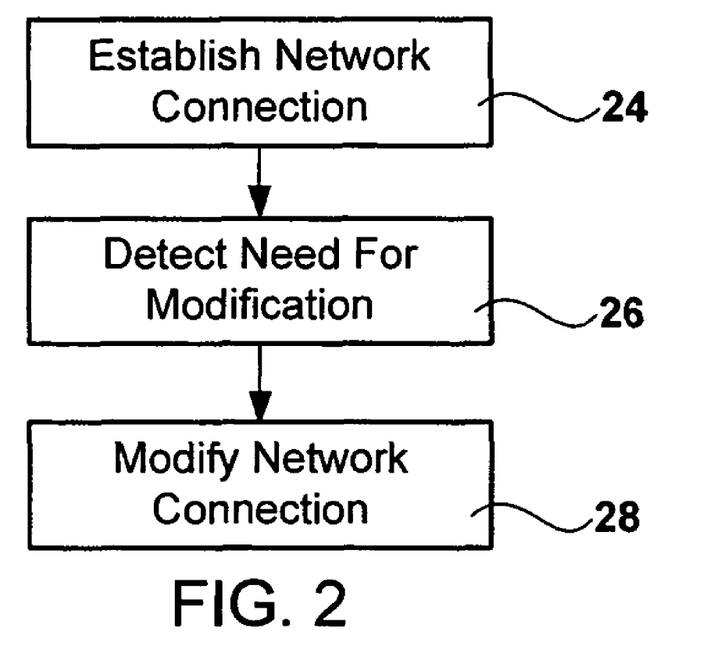
FIG. 2 is a chart showing embodiments comprising connection modification need detection.

Some embodiments of the present invention may be explained with reference to FIG. 2. In these embodiments, a connection is established 24 between network devices. A need for connection modification may then be detected 26. This detection may be performed by one of the devices using the connection or by a third device that is performing as a central coordinator (CCo). In some embodiments, the CCo may reside on one of the device that is using the connection. Detection may comprise passively waiting for a signal or message or may comprise actively monitoring a device, network or other component for a change in condition. Once a need has been detected 26, the network connection may be modified 28 to meet a requirement or condition imposed by the need.

Detection may comprise active detection of a change in channel characteristics or a change in resource demands. Detection may also comprise detection of an allocation request that, when allocated, will cause a conflict with or degradation of an existing allocation. Detection may also comprise passively waiting for a signal, such as a message or request, including, but not limited to, a request for more bandwidth, a request for a new connection, a request for a higher priority QoS assignment or some other message.

Figure 3:
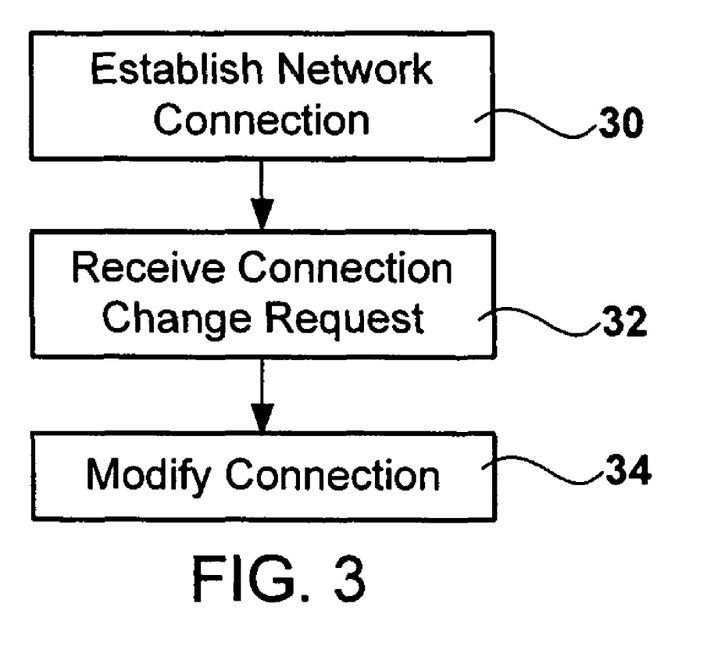
FIG. 3 is a chart showing embodiments comprising connection change requests.

Some embodiments of the present invention, illustrated in FIG. 3, comprise a connection change request. In these embodiments, a network connection is established 30 by a central coordinator (CCo), which may be a part of a network device sharing the connection or may be a separate entity that controls network connections and their parameters. After the connection is established 30, a connection change request is received 32 by the CCo. This request may comprise a bandwidth change request, a QoS change request, a channel change request, a time slot change request or a request for some other change in network allocation parameters. Once the request is received 32, the connection may be modified 34 in some way to improve the connection or make the connection more tolerant to channel conditions.

Figure 4:
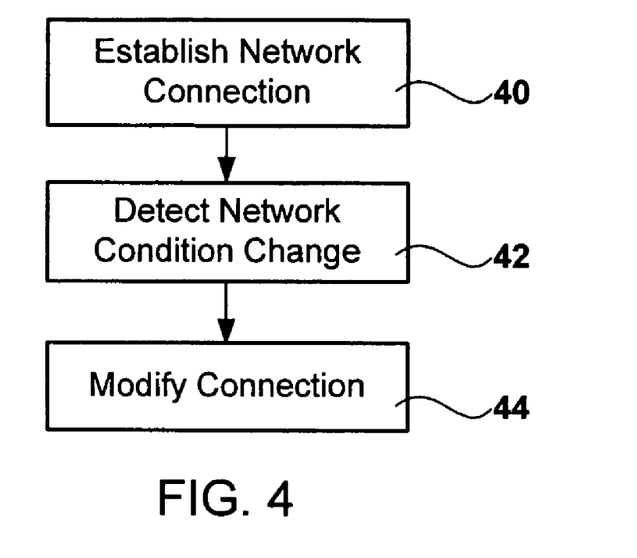
FIG. 4 is a chart showing embodiments comprising network condition change detection.

Some embodiments of the present invention, illustrated in FIG. 4, comprise detection of a network condition change. In these embodiments, a network connection is established 40 and a network condition change is detected 42. In these embodiments, this detection may comprise active detection of a change in network conditions. These conditions may comprise active detection, including monitoring, of network conditions such as, but not limited to, network traffic conditions, network channel interference, stability of the network medium, QoS priority of other connections, bandwidth requested for or provided to other connections, and other network conditions. Once a change is detected 42, a connection may be modified 44 to improve overall network performance or to improve a particular connection or set of connections.

Figure 5:
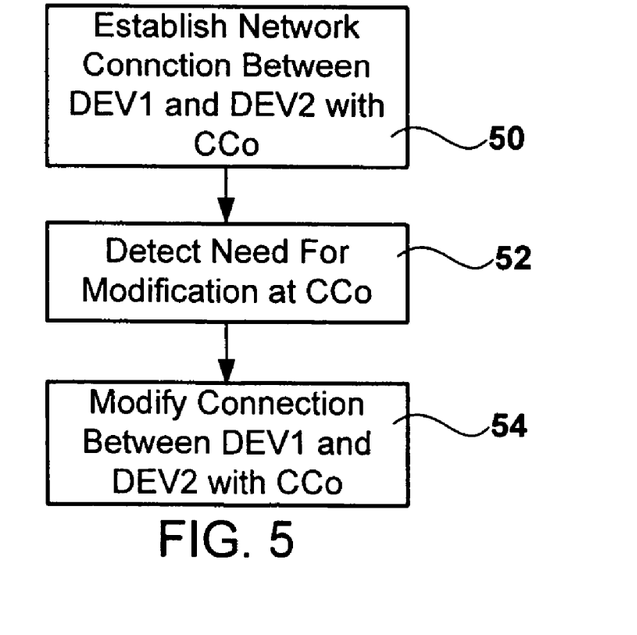
FIG. 5 is a chart showing embodiments comprising connection modification need detection with a CCo.

Some embodiments of the present invention, illustrated in FIG. 5, comprise a separate central coordinator (CCo) that manages network connections. In these embodiments, the CCo established and manages network connections. In an exemplary embodiment, a connection is established 50 between two or more network devices by the CCo. The CCo then detects 52 a need for modification of a network connection. As in previously-described embodiments, this detection may comprise active detection of a change in channel characteristics or a change in resource demands. Detection may also comprise detection of an allocation request that, when allocated, will cause a conflict with or degradation of an existing allocation. Detection may also comprise passively waiting for a signal, such as a message or request, including, but not limited to, a request for more bandwidth, a request for a new connection, a request for a higher priority QoS assignment or some other message. If a need for modification is detected 52, a network connection may be modified 54 to ameliorate the network situation.

Figure 6:
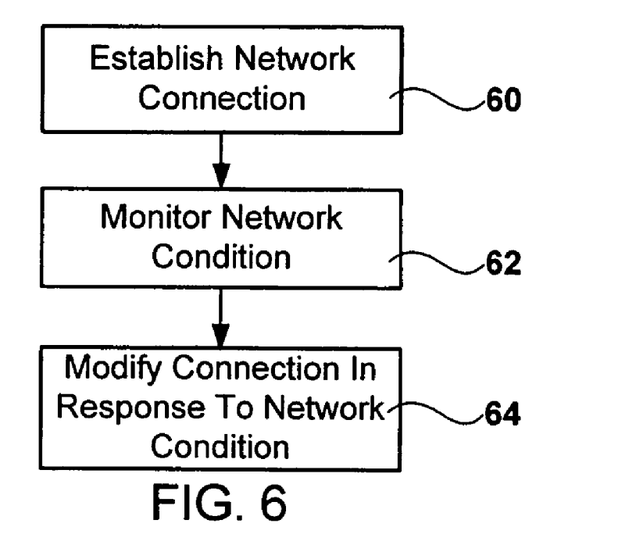
FIG. 6 is a chart showing embodiments comprising network condition monitoring.

Further embodiments of the present invention may be described in relation to FIG. 6. In these embodiments, active monitoring of a network condition is performed. A network connection is established 60 as in other embodiments. The condition of the network is then actively monitored 62 to determine any conditions that might affect connection performance. If a change in condition occurs, a connection may be modified 64 to improve performance or reliability.

Figure 7:
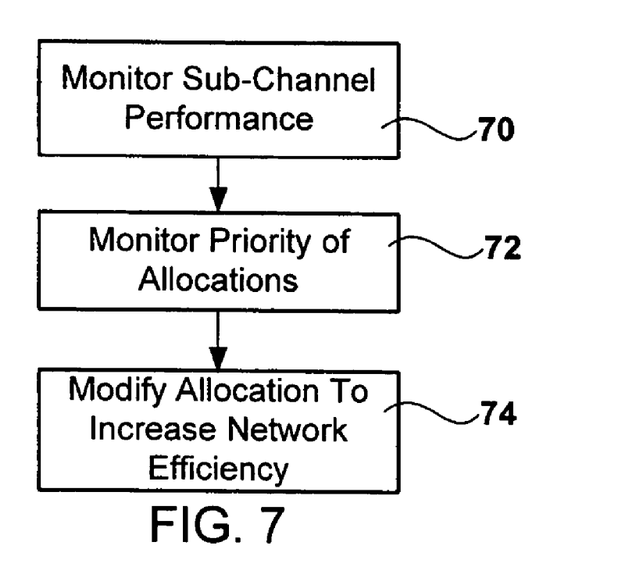
FIG. 7 is a chart showing embodiments comprising sub-channel performance monitoring and allocation priority monitoring.

Other embodiments of the present invention, illustrated in FIG. 7, comprise multiple monitoring steps. In these embodiments, one or more network connections are monitored. A connection may be monitored 70 for sub-channel performance. A connection may also be monitored 72 to keep track of connection priorities, such as QoS assignments. With these network connection parameters being monitored, an accurate picture of the overall network efficiency can be maintained and specific connection allocations may be modified 74 to increase overall network efficiency or the efficiency or performance of specific connections.

Figure 8:
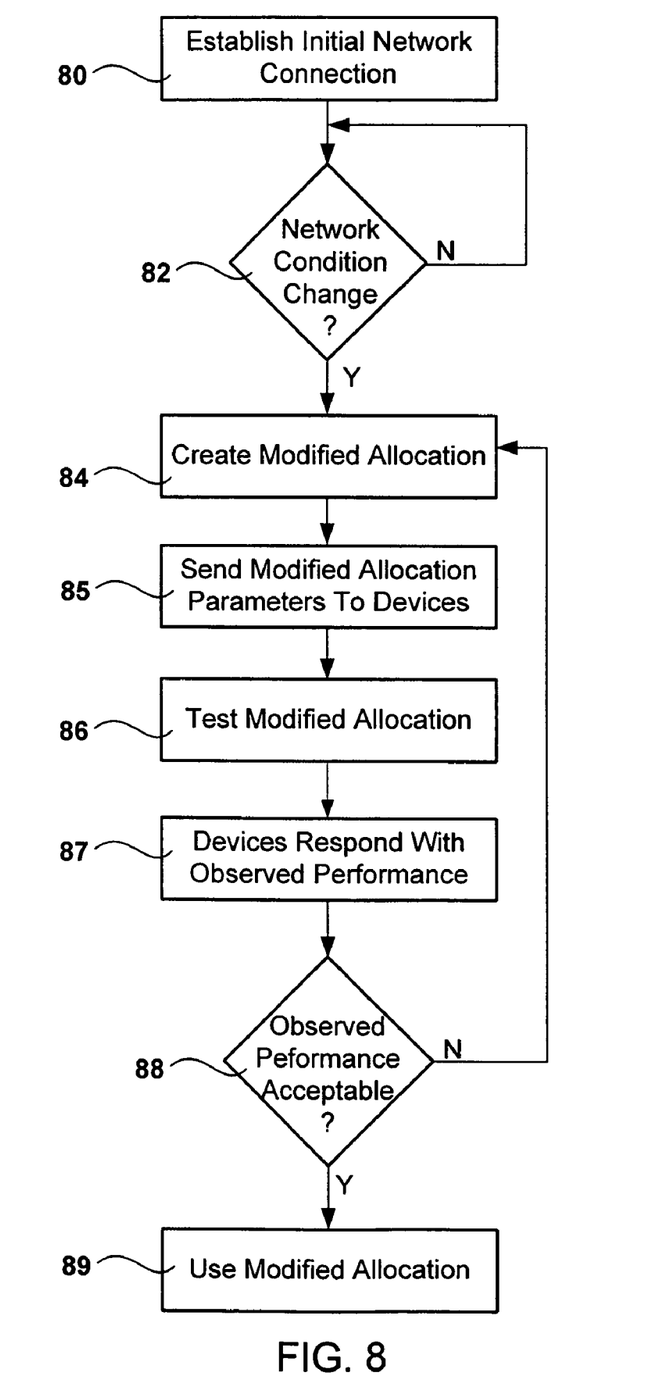
FIG. 8 is a chart showing embodiments comprising modified allocation testing.

Still other embodiments of the present invention may be described with reference to FIG. 8. In these embodiments, a network connection is established 80 and network conditions are detected 82 to determine whether connection modification may ameliorate network or connection performance. If a condition is detected, a modified connection allocation may be created 84, but not immediately applied. This modified allocation is sent 85 to the devices served by the connection and one or more of these devices tests 86 the performance of the modified allocation. The testing device(s) may then respond 87 to the network managing authority, such as a CCo, with a message indicating the modified allocation performance or the acceptability thereof. If the performance of the modified allocation is acceptable 88, the modified allocation may be put into use 89. If the performance is not acceptable, a new modified allocation may be created and tested until an acceptable allocation is found.

Figure 9:
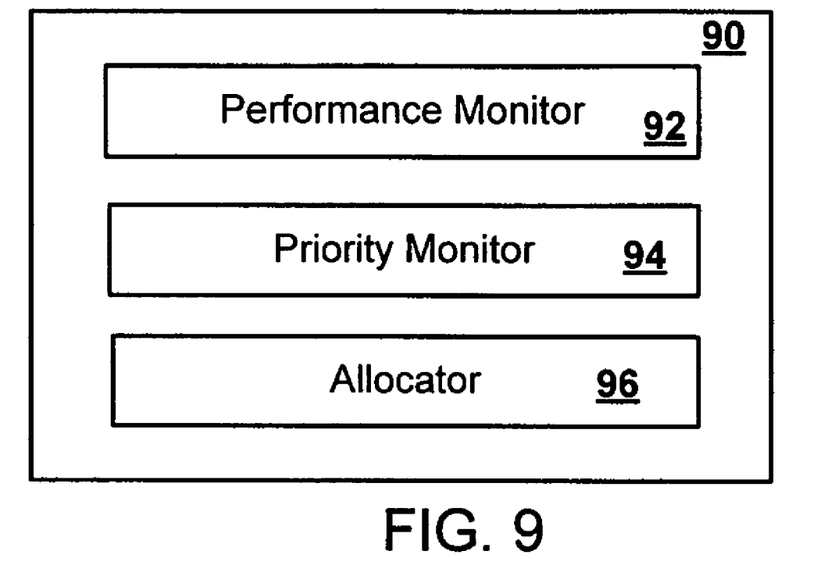
FIG. 9 is a chart showing device embodiments comprising sub-channel performance monitoring and allocation priority monitoring.

Some device embodiments of the present invention, illustrated in FIG. 9, may comprise a network managing authority 90, such as a CCo, which comprises a connection performance monitor 92, a connection priority monitor 94 and an allocator 96 for allocating and modifying network connection parameters.

Figure 10:
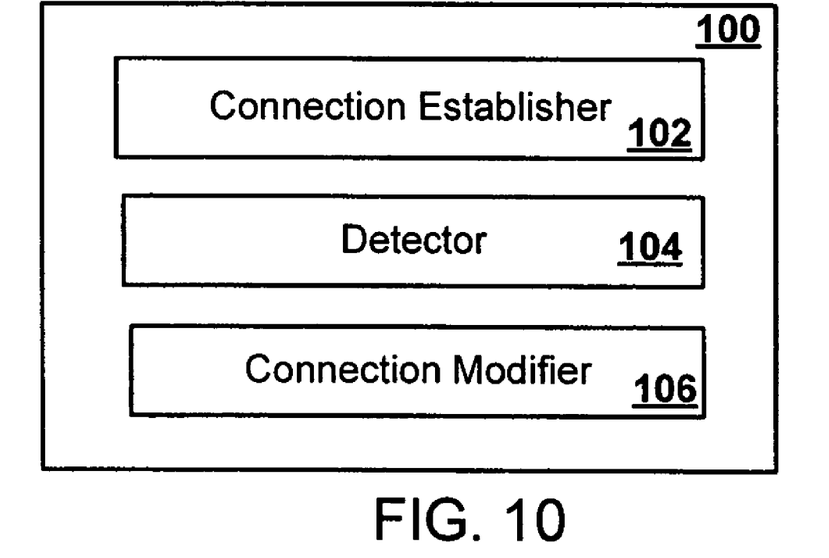
FIG. 10 is a chart showing device embodiments comprising need detection.

Some device embodiments of the present invention, illustrated in FIG. 10, may comprise a network managing authority 100, such as a CCo, which comprises a connection establisher 102 for establishing a connection, a network condition detector 104 for detecting network conditions and a connection modifier 106 for modifying network connections.

Figure 11:
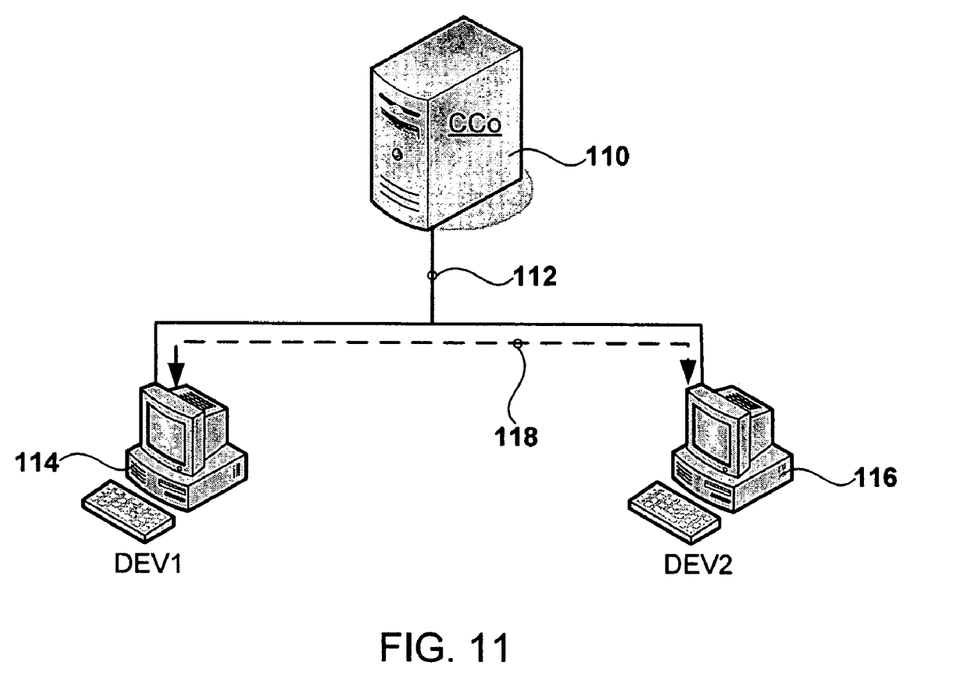
FIG. 11 is a diagram showing an exemplary system embodiment.

Some embodiments of the present invention may be described with reference to FIG. 11. These embodiments comprise an exemplary network system comprising a central coordinator (CCo) 110, which manages network connections. These embodiments also comprise network devices, such as first network device 114 and second network device 116. These network devices may comprise computing devices, such as desktop or laptop computers, personal digital assistants (PDAs), printers, copiers and other computing devices that have the ability to communicate over a network medium. These embodiments further comprise a network medium 112 over which they may communicate. In this exemplary embodiment, the CCo 110 is a computing device that is physically separate from first device 114 and second device 116. In some embodiments, a CCo may be a part of connected network devices.

In this exemplary embodiment, a CCo 110 may create and manage network connections. If first device 114 requests a connection with second device 116, the CCo 110 may establish a connection 118 between the two devices. CCo 110 may further detect network changes and modify this connection or other network connections to account for or adapt to these network changes.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for modifying network allocation parameters for a network connection, said method comprising:

a) establishing a plurality of network connections with network allocation parameters for each of said network connections, wherein said plurality of network connections comprises a first network connection for a first network device and a second network connection for a second network device;

b) detecting a need for modification of said network allocation parameters for said first network connection, wherein said need is based on a change in said network allocation parameters for said second network connection;

c) generating a modified connection allocation for said first network connection;

d) sending said modified connection allocation to a said first device using said network connection;

e) testing said modified connection allocation with said first device; and f) modifying said connection allocation parameters for said first network connection according to said modified connection allocation if said testing is successful.

2. A method as described in claim 1 wherein said detecting comprises receiving a bandwidth change request.

3. A method as described in claim 1 wherein said detecting comprises receiving a QoS change request.

4. A method as described in claim 1 wherein said detecting comprises detecting a change in network channel conditions.

5. A method as described in claim 1 wherein said detecting comprises detecting a fixed periodic allocation that will interfere with said connection.

6. A method as described in claim 1 wherein said detecting comprises receiving a potentially interfering connection request with a higher QoS priority.

7. A method as described in claim 1 wherein said detecting comprises
receiving a new network connection request that cannot be satisfied without
modification of said network allocation parameters for said network connection.

8. A method as described in claim 1 wherein said detecting comprises detecting overall network inefficiency.

9. A method for modifying network allocation parameters for a network connection, said method comprising:

a) establishing a plurality of network connections with a central coordinator (CCo), wherein said plurality of network connections comprises a first connection between a first network device and a second network device, said first connection comprising first network allocation parameters, said plurality of network connections further comprising a second network connection between a third network device and a fourth network device, said second network connection comprising second network allocation parameters;

b) receiving a QoS change request for said second network connection at said CCo, wherein said QoS request cannot be granted without modification of said network allocation parameters for said first network connection;

c) modifying said connection allocation parameters for said first network connection, with said CCo, to fulfill said QoS request.

10. A method as described in claim 9 wherein said QoS change request comprises a bandwidth change request.

11. A method as described in claim 9 wherein said QoS change
request comprises a potentially interfering connection request with a higher QoS priority.

12. A method for modifying network allocation parameters for a network connection, said method comprising:

a) establishing a plurality of network connections, said network connections comprising a first network connection and a second network connection wherein said first network connection comprises first network allocation parameters and said second network connection comprises second network allocation parameters;

b) monitoring a network condition related to said second network connection;

c) generating a modified connection allocation when said network condition meets a criterion, wherein said modified connection allocation increases bandwidth for said second network connection to adjust to said network condition and said modified connection allocation decreases bandwidth to said second network connection to provide additional bandwidth to said second network connection; and d) modifying said first network allocation parameters for said first_network connection according to said modified connection allocation when said testing is successful.

13. A method as described in claim 12 wherein said network condition comprises network channel conditions.

14. A method as described in claim 12 wherein said network condition comprises allocations for said second network connection.

15. A method as described in claim 12 wherein said network condition comprises QoS priorities for said second network connection.

16. A method as described in claim 12 wherein said network condition comprises overall network efficiency.

17. A method as described in claim 12 wherein said network condition comprises a change in error rate for a sub-channel.

18. A method as described in claim 12 wherein said network condition comprises the quantity of connections.

19. A method as described in claim 12 wherein said network condition comprises the relative priority of said first network connection and said second network connection.

20. A method for allocating network resources, said method comprising:

a) establishing a plurality of network connections with network allocation parameters for each of said network connections, wherein said plurality of network connections comprises a first network connection for a first network device and a second network connection for a second network device;

b) monitoring the performance of sub-channels allocated to said second network devices;

c) monitoring the QoS priority of said sub-channel allocations;

d) monitoring the network efficiency cost of sub-channels that must be assigned as guard bands or pilot signals based on the modulation of said sub-channels allocated to said second network device; and e) modifying at least one sub-channel allocated to said first network device to improve overall network efficiency based on said monitoring of said sub-channels allocated to said second network device.

21. An apparatus for modifying network allocation parameters, said apparatus comprising:

a) a connection establisher for establishing a plurality of network connections, comprising a first network connection comprising first network allocation parameters and a second network connection comprising second network allocation parameters;

b) a detector for detecting a need for a network allocation parameter change based on a change in a connection need for said second network connection;

c) a network allocation modifier for generating a first modified network allocation with modified first network allocation parameters for said first network connection based on said need for said second network connection;

d) a sender for sending said modified allocation parameters to a first device using said first network allocation parameters;

e) a tester for testing said modified first network allocation parameters, said tester being resident on said first device using said first network allocation parameters; and f) a connection modifier for implementing said modified first network allocation parameters when said tester achieves a successful test.

22. A system for managing network connections, said system comprising:

a) a central controller (CCo);

b) a first network device, said first device comprising a network parameter tester;

c) a second network device;

d) a communication medium connecting said CCo, said first network device and said second network device;

e) wherein said CCo establishes a first connection between said first network device and said second network device, said connection comprising a network allocation parameter;

f) wherein said CCo detects a condition that relates to a second connection of said medium, wherein said second connection does not connect between said first network device and said second network device, and wherein said CCo generates a modified network allocation parameter and sends said modified network allocation parameter to said first device for testing;

g) wherein said CCo implements said modified network allocation parameter when said testing is successful.

* * * * *